United States Patent [19]

Klancnik et al.

[11] Patent Number: 4,637,524
[45] Date of Patent: Jan. 20, 1987

[54] MACHINE TOOLS

[75] Inventors: Adolph V. Klancnik, Glenview; Kenneth A. Klancnik, Palatine, both of Ill.

[73] Assignee: Universal Automatic Corporation, Des Plains, Ill.

[21] Appl. No.: 730,497

[22] Filed: May 6, 1985

[51] Int. Cl.[4] .............................................. B23Q 7/06
[52] U.S. Cl. ................................... 221/239; 221/262; 221/270; 269/34
[58] Field of Search .............. 221/262, 268, 270, 239, 221/294; 269/34, 254 R, 254 CS, 25

[56] References Cited

U.S. PATENT DOCUMENTS 3,057,514 10/1962 Dixon .............................. 221/262 X
3,114,477 12/1963 Dixon .............................. 221/262 X
3,733,006 5/1973 Klancnik ............................ 221/262

FOREIGN PATENT DOCUMENTS 206638 2/1984 Fed. Rep. of Germany ........ 269/25
770746 10/1980 U.S.S.R. ............................... 221/268

Primary Examiner—Joseph J. Rolla
Assistant Examiner—David H. Bollinger
Attorney, Agent, or Firm—Kinzer, Plyer, Dorn & McEachran

[57] ABSTRACT

Coacting, self-centering jaw members in a machine tool which machines small, cylindrical lightweight workpieces; coaction and self-centering is achieved by an equalizer arm actuated by a slide; the slide also actuates one jaw member while the equalizer applies an equal force to the other jaw member; a spring bias applied to each jaw member speeds production.

3 Claims, 7 Drawing Figures

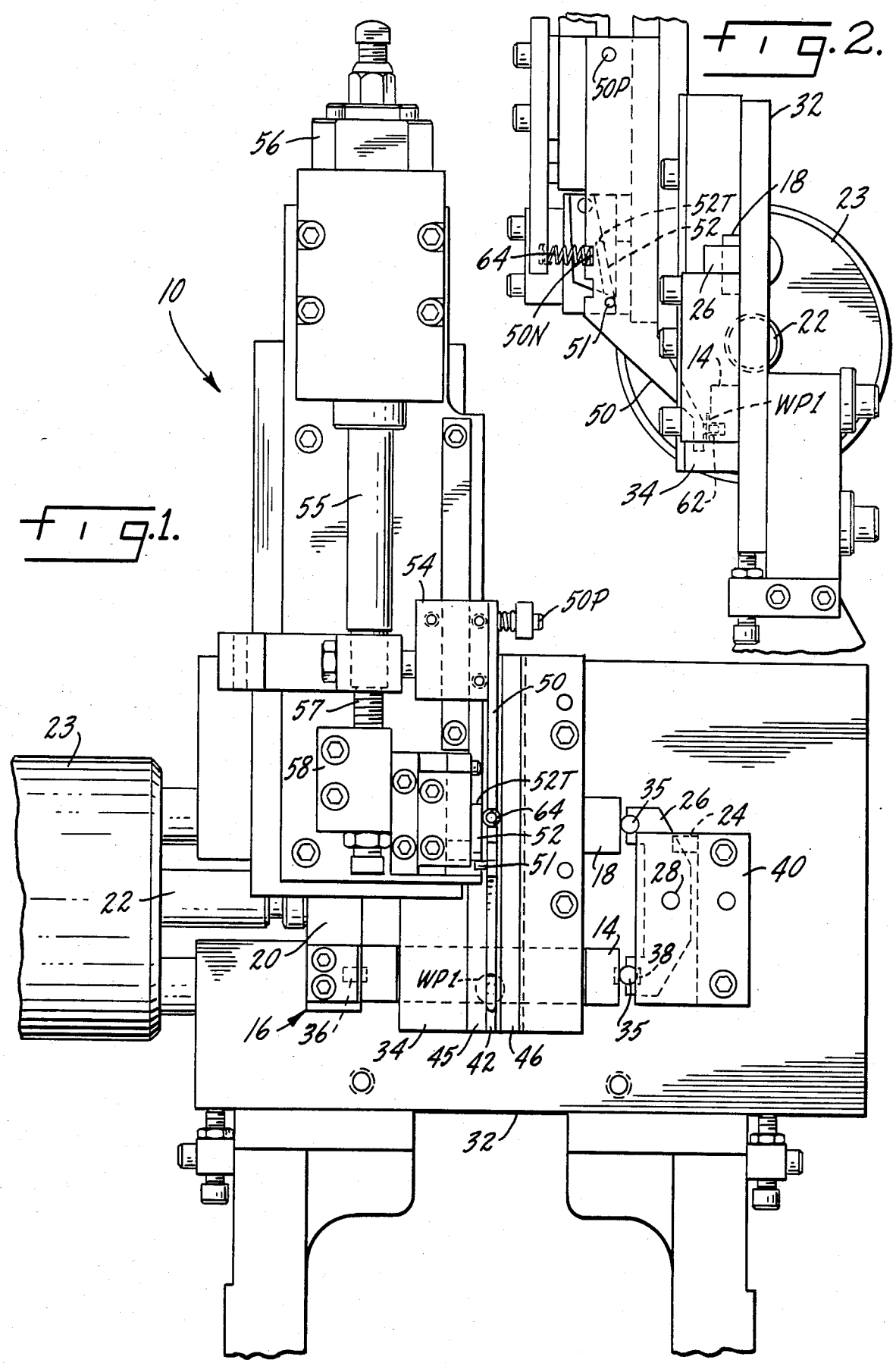

MACHINE TOOLS

This invention relates to machine tools and in particular one employed to tap, bore or face small light-weight cylindrical parts susceptible to distortion or disorientation if not carefully but effectively clamped when the tool is working. More particularly the invention is concerned with a pair of jaw members and equalizer assembly which assures tender but positive control over a workpiece as it is fed to the work station further assuring that the jaw members apply substantially equal holding forces on opposite sides of the workpiece while the tool is performing the machining operation.

One of the objects of the invention is to combine a pair of sliding workpiece clamping jaws with an actuating slide and an equalizer arm whereby movement of the slide and equalizer arm actuate the jaws to clamping position in such a fashion that the workpiece is clamped on opposite sides with substantially equal force. A related object of the invention is to bias the jaw members by spring action thus enabling the jaw members to serve as a workpiece detent during transfer of the workpiece from ready position to the work station when the jaw members are relaxed.

As noted above, we are concerned with small, lightweight pieces in which gravity cannot be depended upon for assured, positive feeding to the work station or even as an assured aid to feeding. Such pieces, then, can easily hang up or become disoriented; they can also become stuck in transit due to the cutting oil. Another object of the invention, of primary order or precedence, is to enable a machine tool for machining small, delicate, lightweight parts to operate faster than heretofore and to achieve this in part by so constructing a pair of workpiece clamping jaws that they may be relaxed and in this state employed in a detenting role, controlling movement of the workpiece in a precise manner. Faster operation from the standpoint of reliable production of small parts is further assured, as another object of the invention, by clamping the workpiece not only by means of the jaws in a detenting role as aforesaid but also by a holding force equal on both sides of the workpiece so that it is not crushed, distorted or disoriented at the time of machining it.

IN THE DRAWINGS:

FIG. 1 is a front elevation of a machine tool incorporating the present invention;

FIG. 2 is a fragmentary detail view at the right hand side of the machine shown in FIG. 1;

DETAILED DESCRIPTION OF THE INVENTION

The machine tool 10, FIG. 1, of the present invention is one intended to drill, tap or perform some other machining operation on small, lightweight workpieces such as the workpiece WP1, FIG. 1, shown in position to be tapped. An identical workpiece WP2 is shown in FIG. 3 in ready position, ready to be fed next to the work station.

Figure 3:
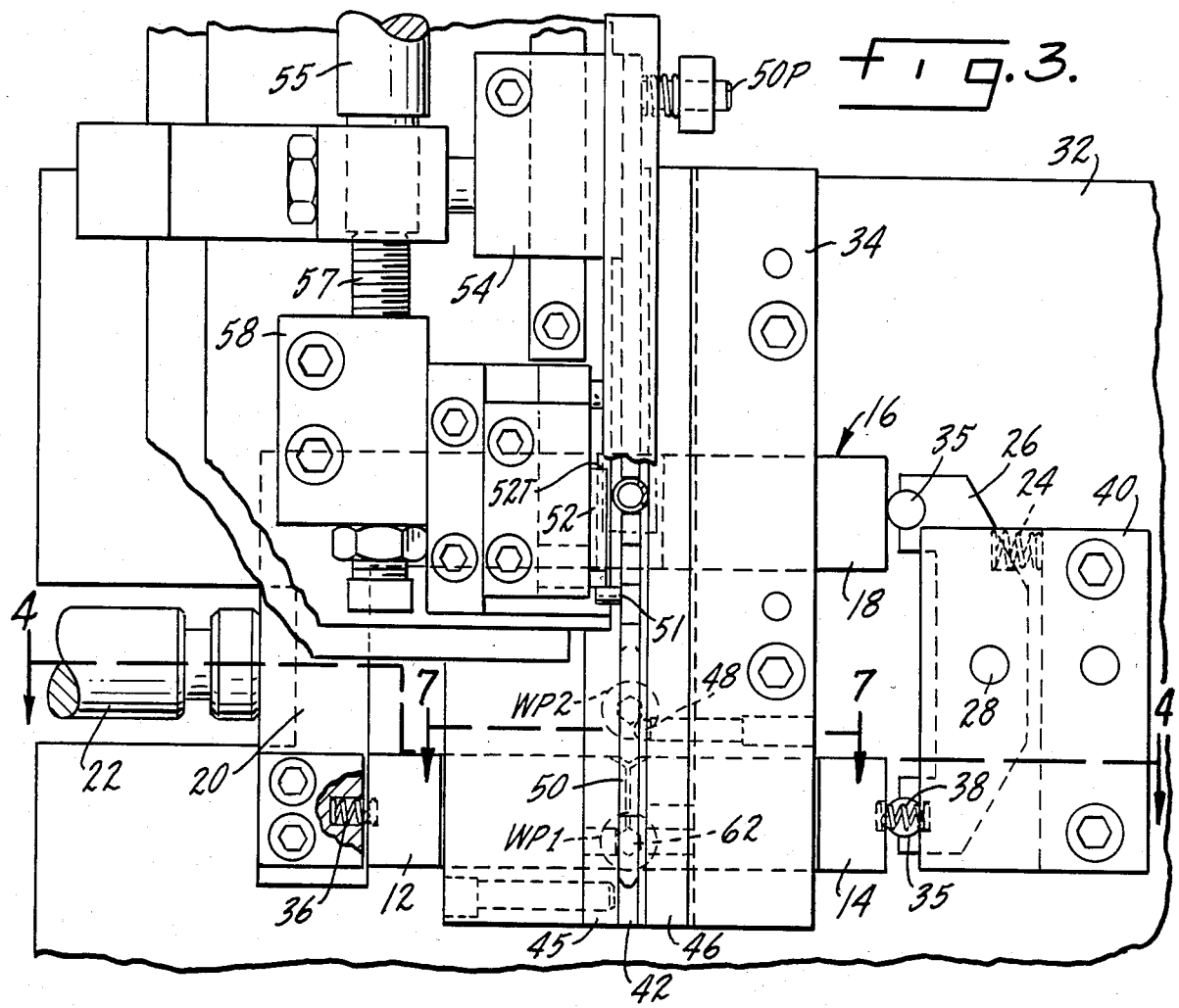
FIG. 3 is a fragmentary front elevation detail view of the machine, on an enlarged scale.
Figures 5, 6:
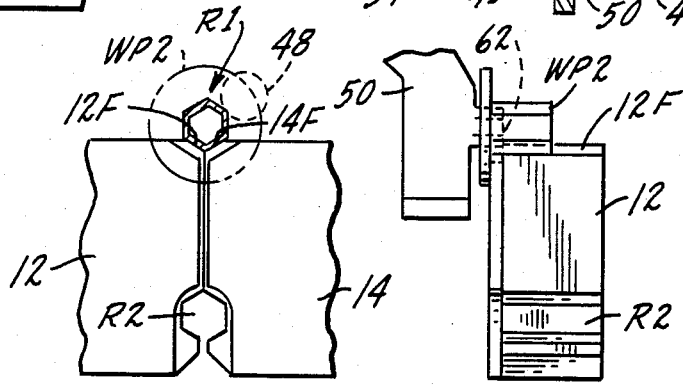
FIG. 5 is a fragmentary detail view of the jaw members.
FIG. 6 is a side elevation (inside) of one of the jaw members.
Figure 7:
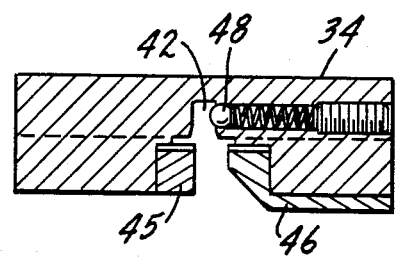
FIG. 7 is a detail sectional view on the line 7—7 of FIG. 3.

The workpiece is clamped at the work station by a pair of sliding jaw members 12 and 14, FIGS. 3, 5 and 6. The jaw members 12 and 14 are shown in their engaged position in FIGS. 3 and 5. They have been moved to this position by a substantially L-shaped jaw member actuating slide 16, FIG. 3, having a first or upper leg 18 and a second or side leg 20. This jaw member actuating member is moved a short distance to the right, as viewed in FIG. 3, by a fluid-operated piston 22 (and cylinder 23), against the return action of a spring 24.

Spring 24 is associated with an equalizer arm 26 pivoted at its mid-point on a pin 28 so that when arm 26 is rocked, its two ends rock through equal distances. This rocking motion is very slight for reasons to be explained.

Figure 4:
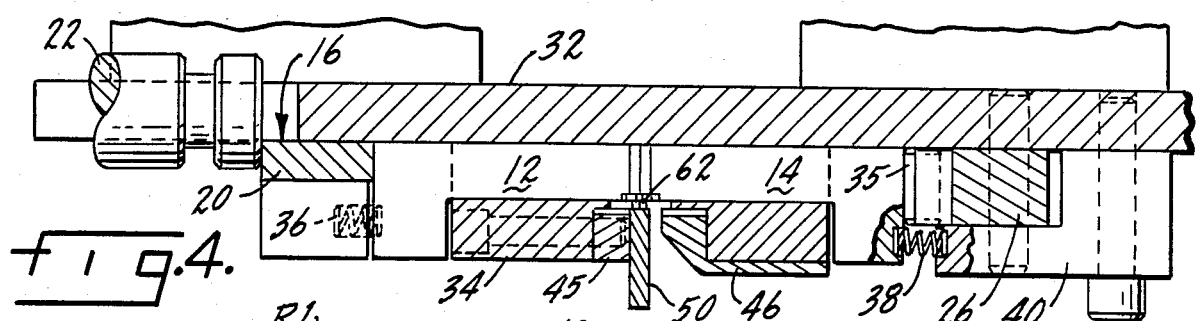
FIG. 4 is a sectional view on the line 4—4 of FIG. 3.

Referring to FIGS. 3 and 4, the jaw members 12 and 14 are guided by and between a back plate 32 and a front magazine plate 34. As shown in FIG. 3, jaw member 12 has one end opposed to the lower end of leg 20 of the actuating slide 16 and jaw member 14 has one end opposed to the lower extent of arm 26. The upper extent of arm 26 is opposed to the free end of leg 18 of the slide 16.

When the piston 22 is actuated or driven to the right, as shown in FIG. 3, jaw member 12 is moved a small increment to its clamping position by the lower leg 20 of slide 16 and at the same time the free end of the upper leg 18 of slide 16 rocks arm 26 clockwise so that the lower end thereof advances jaw member 14 a small increment to clamping position. These are slight movements because the workpiece has a thin-walled cylindrical shank, easily crushed. The upper and lower extents of arm 26 are provided with short cylindrical pins 35 engageable respectively with the free end of slide 18 and the right-hand end of jaw member 14 to assure equalizing tangential contact therewith, which is to say that when the L-shaped slide 16 is actuated to close the jaw members in their clamping mode the two jaw members move through equal distances and apply equal forces to opposite sides of the workpiece at the working station. Further, in accordance with the present invention, jaw member 12 is coupled to the side leg 20 of slide 16 by spring 36. This spring tends to bias jaw member 12 toward its closing or clamping position. In like manner, a spring 38, FIG. 3, has one engaging jaw member 14 and an opposite end anchored in a recess in a support 40 which also supports the pivot pin 28 for rocker arm 26.

The spring biases thus applied to the jaw members 12 and 14 enable the jaw members to be employed in a detenting action when feeding a workpiece from ready position through the jaws to the work station, as will be explained below.

The workpieces, as noted, have a thin-walled cylindrical shank; they also have a flat rim or flange, like a washer. The piece is to be tapped all the way through, the tap first penetrating the washer or flanged end and then to the inside of the shank.

The workpieces are arranged in a vertical series in a guide slot 42 of a magazine which includes the front plate 34, FIG. 4. The magazine also includes a pair of opposed guide rails 45 and 46. These guide rails are disposed and arranged in cooperation with one another, together with the magazine front plate or guide 34, to define the supply channel 42 for the workpieces. Different configurations can be accommodated, this being made possible by noting that the guide rails themselves are separate members, readily replaceable by guide rails of different geometry for workpieces of different geometry.

The workpieces are stacked in the magazine for gravity fall movement downward through the channel 42 until stopped by a ball detent 48, FIG. 3, biased by a spring to project into the supply channel. This defines the "ready" position of the piece next to be fed to the work station. However, because of their lightweight nature, gravity feed cannot be relied upon for assured feeding to the work station. Accordingly a feed finger 50 is employed, FIGS. 1 and 2, operating on the principles described in Klancnik U.S. Pat. No. 3,733,006. Thus the feed finger 50, FIG. 2, is pivoted at 50P and provided with a cam follower pin 51 positioned at the underside of the sloped face of a cam projection 52, FIG. 2, when a workpiece as WP1 has been located at the work station. To feed the next workpiece, finger 50 is lifted by a slide 54, FIG. 1, to which it is secured. Slide 54 is in turn coupled to an air-operated piston 55, reciprocal by a cylinder 56. An adjustable stop screw 57, supported in a nut 58, determines the effective stroke of piston 55 and therefore the effective stroke of the feed finger 50.

The jaw members have both an actuated or compressed mode and a relaxed mode. When piston actuator 22 is retracted under the influence of return spring 24 (which is a very tiny stroke) jaw members 12 and 14 are then in their relaxed state, solely under the influence of the biasing springs 36 and 38. Nonetheless, they are closed and in this position are adapted to expand or open so to permit transit of the next workpiece WP2 that is to be advanced to the work station, following the machining operation performed on workpiece WP1, FIG. 2. To this end, the upper corners of the two jaws 12 and 14, FIG. 5, are beveled and chamfered, 12F and 14F, to provide a first recess R1 to cradle (and reorient, if necessary) the shank of each workpiece which, it may be noted, is a shank with a hexaganol external contour. The jaws are complementally recessed to provide a second recess R2 of full hexagonal extent to clamp the workpiece, defining the work station.

The feed finger 50 is provided with a stud 62, FIG. 2, which fits into the open (front) end of the workpiece shank during feeding under spring influence, as will be explained. When the feed finger is lifted by its slide 54, cam pin 51 follows the cam slope shown at the lower end of cam 52, retracting stud 62 from the workpiece, and the timing is such that at this time the jaws 12 and 14 have been actuated to clamp the workpiece at the working station. Pin 51 rides off the cam slope as the feed finger continues to be lifted and when the pin 51 arrives at the top of the cam, 52T, a feed finger biasing spring 64, having one end anchored in a back plate, FIG. 2, and the opposite end acting in a notch 50N in the feed finger, snaps the feed finger stud 62 back into the supply channel. This takes place just above the ball detent 48 where the next workpiece is resting; the stud 62 fits into the shank of this workpiece.

In the meantime, during retraction of the feed finger, the workpiece at the work station has been machined. The jaws 12 and 14 may now be relaxed and the feed finger advanced. In the event the stud 62 does not fully orient the workpiece, the chamfers 12F and 14F (120° angle) will do so when the advancing workpiece WP2 meets the upper edge of the relaxed jaws 12 and 14. Workpiece WP2 now spreads the jaws since they are relaxed; workpiece WP2 on further downward movement of the feed finger will eject workpiece WP1 but in the event there was failure to capture workpiece WP2 on stud 62, the latter will both spread the jaws and eject workpiece WP1.

Hence while we have illustrated and described a preferred embodiment of the invention it is to be understood that this is capable of variation and modification by those skilled in the art.

We claim:

1. In a machine tool in which small easily distorted workpieces such as hollow pins, studs and the like disposed in a supply channel are advanced from a ready position therein to a work station to have a tapping, drilling facing or like operation performed thereon, a pair of self-centering jaw members and force equalizer assembly mounted to the tool for clamping with substantially equal force opposed sides of the workpiece fed to the work station and comprising:

a substantially L-shaped jaw actuating slide having one leg guided for reciprocal movement, and means for reciprocating the slide in an advancing and retracting direction respectively when the workpiece is to be clamped by actuating the jaw members and released by relaxing the jaw members at the work station;

said slide having its other leg located on one side of the work station;

an equalizing rocker arm positioned on the other side of the work station and pivoted at its mid-point to present one end portion thereof in the path of the one leg of the slide for actuation by the advancing slide to locate the jaw members in the clamping mode;

the free end of said one leg of the slide engaging one end of the rocker arm to pivot the rocker arm when the slide advances;

a first jaw member guided for sliding movement and having one end opposed to said other leg of the slide so as to be advanced therewith in a closing direction toward the workpiece at the work station when the slide advances;

a second jaw member guided for sliding movement and disposed on the side of the work station opposite the first jaw member and opposed to the other end portion of said rocker arm to be advanced thereby in a closing direction toward the work station when the rocker arm is actuated;

said jaw members at their inner ends nearer the work station presenting a holding recess for clamping the sides of a workpiece advanced from the supply channel thereto, said equalizing rocker arm assuring the workpiece in the holding recess in held on opposite sides with an equal force when the slide is advanced to actuate both jaw members;

a first spring interposed between said one end of the first jaw member and said other leg of the slide, a second spring interposed between said other end of the rocker arm and said second jaw member, whereby the springs are effective to apply a bias to the jaw members tending to close the jaw members; and a reciprocal feed finger for feeding the workpieces in the channel successively to the recess presented by the jaw members when the jaw members are relaxed.

2. In a machine tool according to claim 1, said means for reciprocating the slide including a piston to advance the slide and a return spring acting on the equalizer arm to retract the slide.

3. In a machine tool according to claim 1 in which the workpiece has flat sides, said feed finger being configured with corresponding flat surfaces to orient the workpiece for the machining operation, and said jaw members having a recess above the first-named recess and also configured with flat surfaces complemental in part to the workpiece also to assure orientation of the workpiece.

* * * * *